United States Patent
Koehler et al.

(10) Patent No.: US 10,893,116 B1
(45) Date of Patent: Jan. 12, 2021

(54) APPARATUSES AND METHODS FOR EDGE COMPUTING APPLICATION DEPLOYMENT IN AN IOT SYSTEM

(71) Applicant: Nutanix, Inc., San Jose, CA (US)

(72) Inventors: Heiko Friedrich Koehler, San Jose, CA (US); Keshav Sai Srinivas Nanduri, Milpitas, CA (US); Sandeep Reddy Goli, San Jose, CA (US); Satyam Vaghani, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/526,816

(22) Filed: Jul. 30, 2019

Related U.S. Application Data

(60) Provisional application No. 62/870,146, filed on Jul. 3, 2019.

(51) Int. Cl.
*G06F 15/16* (2006.01)
*H04L 29/08* (2006.01)
*H04L 12/24* (2006.01)

(52) U.S. Cl.
CPC ...... *H04L 67/2823* (2013.01); *H04L 41/0806* (2013.01); *H04L 67/1097* (2013.01)

(58) Field of Classification Search
CPC ..... H04L 67/10; H04L 67/1097; H04L 41/00; G06F 8/70; G06F 9/5072
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |
| 9,600,494 B2 | 3/2017 | Maluf et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |

(Continued)

OTHER PUBLICATIONS

Cano, Ignacio et al. "Curator: Self-Managing Storage for Enterprise Clusters"; University of Washington; published Mar. 2017; pp. all.

(Continued)

*Primary Examiner* — Brian Whipple
*Assistant Examiner* — Gregory P Tolchinsky
(74) *Attorney, Agent, or Firm* — Dorsey & Whitney LLP

(57) ABSTRACT

A centralized Internet of Things (IoT) manager of an IoT system is configured generate and deploy a data pipeline application to an edge system. The centralized IoT manager is configured to receive a request for a data category and identification of a data transformation function, identify a data source of the IoT system belonging to the data category, and identify an edge system of the IoT system associated with the data source. The centralized IoT manger is further configured to generate a containerized data pipeline application based on a configuration of the edge system that is configured apply the data transformation function to input data to provide transformed data, and provide the containerized data pipeline application to the edge system.

22 Claims, 9 Drawing Sheets

(56) References Cited

U.S. PATENT DOCUMENTS

| | | | |
|---|---|---|---|
| 2015/0261876 | A1 | 9/2015 | Trikha et al. |
| 2016/0357525 | A1 | 12/2016 | Wee et al. |
| 2017/0005820 | A1 | 1/2017 | Zimmerman et al. |
| 2017/0060574 | A1 | 3/2017 | Malladi et al. |
| 2017/0099176 | A1 | 4/2017 | Jain |
| 2017/0201585 | A1 | 7/2017 | Doraiswamy et al. |
| 2018/0054490 | A1 | 2/2018 | Wadhwa et al. |
| 2018/0234351 | A1* | 8/2018 | Amento ............... G06F 9/5072 |
| 2018/0300124 | A1* | 10/2018 | Malladi ............... H04L 12/2823 |
| 2018/0324204 | A1* | 11/2018 | McClory ............... G06F 9/505 |
| 2019/0014048 | A1 | 1/2019 | Krishna Singuru |
| 2019/0041824 | A1 | 2/2019 | Chavez et al. |
| 2019/0045033 | A1 | 2/2019 | Agerstam et al. |
| 2019/0098113 | A1* | 3/2019 | Park ............... G06F 16/9024 |
| 2019/0123959 | A1* | 4/2019 | Joshi ............... G05B 23/024 |
| 2020/0014633 | A1* | 1/2020 | You ............... H04L 67/12 |
| 2020/0073739 | A1* | 3/2020 | Rungta ............... G06F 11/1484 |
| 2020/0112487 | A1* | 4/2020 | Inamdar ............... H04L 67/10 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://steveripoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbibie.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

* cited by examiner

APPARATUSES AND METHODS FOR EDGE COMPUTING APPLICATION DEPLOYMENT IN AN IOT SYSTEM

CROSS REFERENCE TO RELATED APPLICATION(S)

This application claims priority to provisional application No. 62/870,416 filed Jul. 3, 2019, which application is hereby incorporated by reference in its entirety for any purpose.

BACKGROUND

Internet of Things (IoT) systems are increasing in popularity. Generally, IoT systems utilize a number of edge devices. Edge devices may generally refer to computing systems deployed about an environment (which may be a wide geographic area in some examples). The edge devices may include computers, servers, clusters, sensors, appliances, vehicles, communication devices, etc. Edge devices may obtain data (including sensor data, voice data, image data, and/or video data, etc.). While edge devices may provide some processing of the data at the edge device, in some examples edge devices may be connected to a centralized analytics system (e.g., in a cloud or other hosted environment). The centralized analytics system, which may itself be implemented by one or more computing systems, may further process data received from edge devices by processing data received by individual edge devices and/or by processing combinations of data received from multiple edge devices.

Within an Internet of Things (IoT) computing environment, real-time data analytics computations at edge systems of an IoT system can be complex due to the distributed nature of edge system computing and diversity in methods and protocols for ingesting, processing, and communicating information back to a data cloud. That is, edge systems may be deployed over a wide geographic area, and diversity among the edge systems may make deployment of applications to retrieve and consume edge data across multiple edge systems of the IoT system difficult.

As the number of edge systems advantageously increases, it may become increasingly complicated to account for the disparate data types and acquisition methods employed by edge devices, the variety of analytical operations capable of being performed by the centralized analytics system, and/or the immense flow of data between the edge devices and the analytics system.

DETAILED DESCRIPTION

Figure 1:
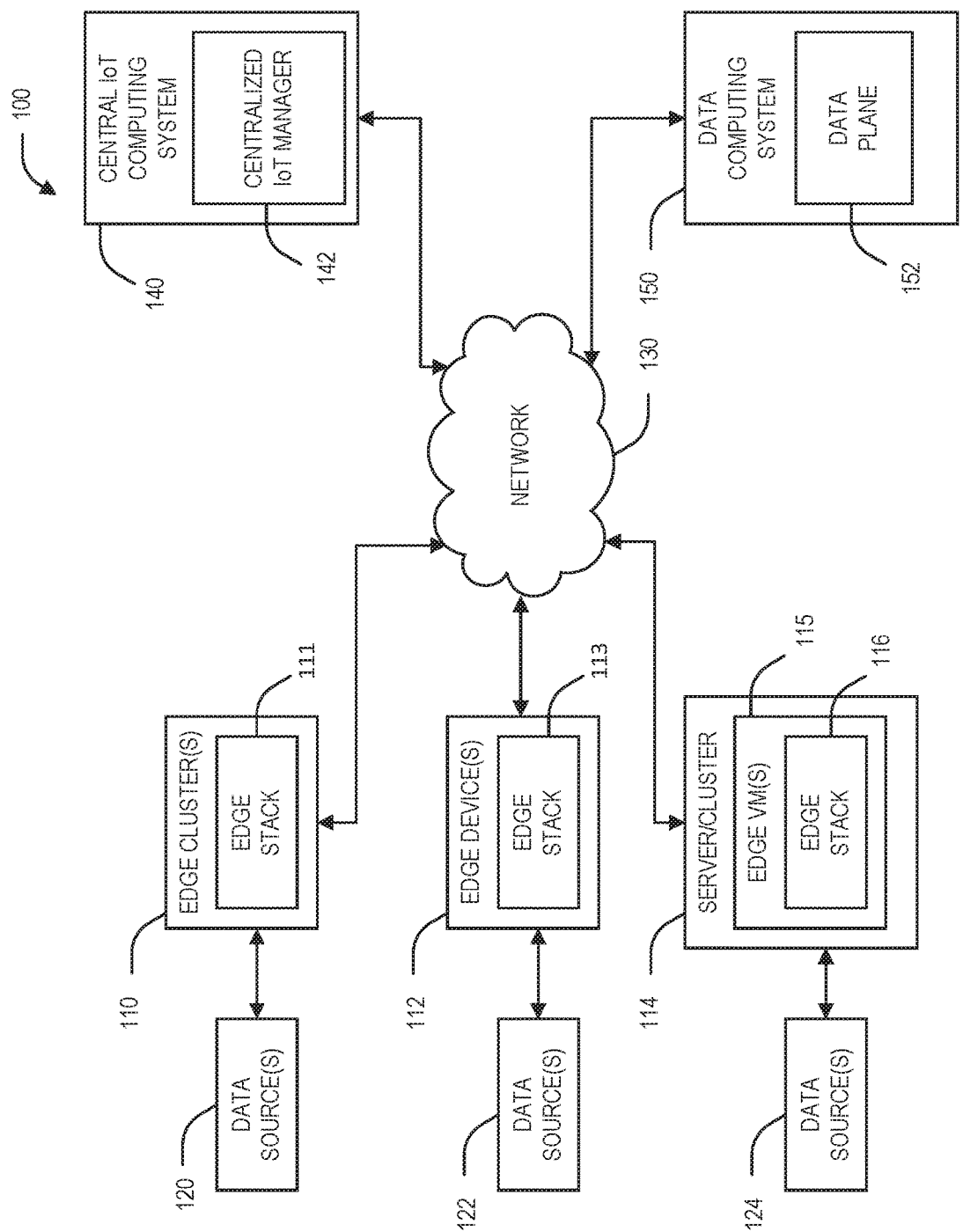
FIG. 1 is a block diagram of an Internet of Things system, in accordance with an embodiment of the present disclosure.

Examples described herein include a centralized Internet of Things (IoT) manager of an IoT system configured to manage deployment of data pipelines to edge systems for computing within an IoT system via a control plane. Data pipelines are applications that are constructed using a group of containers that each perform various functions within the data pipeline (e.g., subscriber, data processor, publisher, connectors that transform data for consumption by another container within the application, etc.) to transform or process input data to provide output data. Each data pipeline may be formed in a respective "sandbox" and include a group of containers that communicate with each other via a virtual intra-"sandbox" network (e.g., a pod). The centralized IoT manager may reside in the cloud (e.g., a remote computing system), and may selectively deploy or provide respective data pipelines to edge systems (e.g., or devices, sensors, computers, host machines, nodes, clusters, etc.) that are close to data sources (e.g., sensors, input devices, output devices, etc.) providing the source data that generates events relevant to the respective data pipeline. In response to receipt of a data pipeline, an edge system may be configured to determine whether to deploy the data pipeline for use based on whether relevant data sources and/or other relevant input data for the data pipeline are available to the edge system. In response to receipt of a request for a data pipeline related to a category or some other sensor attribute (e.g., all cameras facing a particular direction or on a particular floor), the centralized IoT manager may identify data sensors within the category and edge systems associated with the identified data sources, and may construct or build a data pipeline application (e.g., serverless code) to be deployed to the identified edge systems. Categories or attributes of sensors may include sensor type (e.g., video, audio, temperature, etc.) physical location, coverage area, etc.). A sensor may belong to more than one category or have more than one attribute. In some examples, the definition of stages of a constructed data pipeline application may be described using a user interface or representational state transfer (REST) API, with data ingestion and movement handled by connector or transform components built into the data pipeline.

In this manner, a large number of edge systems may readily be configured with only the necessary data pipelines. For example, individual edge systems may subscribe to or otherwise associate with specific categories. On connection to a centralized IoT manager, the centralized IoT manager can push serverless code to designated edge systems which may be specific to architecture of each edge system and establish only those data pipelines on a particular edge system that are needed to support the categories in use at the edge system. This may reduce the resources necessary at the edge system (e.g., the edge system need not support ALL data pipelines, and the edge system may nonetheless be automatically configured with serverless code).

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of an Internet of Things (IoT) system 100, in accordance with an embodiment of the present disclosure. The IoT system 100 may include one or more of any of edge cluster(s) 110 coupled to respective data source(s) 120, edge device(s) 112 coupled to respective data source(s) 122, a server/cluster 114 coupled to respective data source(s) 124 and configured to host one or more edge virtual machines VM(s) 115. The IoT system 100 may further include a central IoT computing system 140 coupled to the one or more of the edge cluster(s) 110, the edge device(s) 112, and/or the edge VM(s) 115 hosted on the server/cluster 114 via a network 130 to manage configuration and operation of the IoT system 100. The IoT system 100 may further include a data computing system 150 coupled to the network 130 to configured to receive, store, process, etc., data received from the one or more of the edge cluster(s) 110, the edge device(s) 112, and/or the server/cluster 114 via a network 130.

The network 130 may include any type of network capable of routing data transmissions from one network device (e.g., the edge cluster(s) 110, the edge device(s) 112, the server/cluster 114, a computing node of the central IoT computing system 140, and/or a computing node of the data computing system 150) to another. For example, the network 130 may include a local area network (LAN), wide area network (WAN), intranet, or a combination thereof. The network 130 may include a wired network, a wireless network, or a combination thereof.

The IoT system 100 may include one or more types of edge systems selected from any combination of the edge cluster(s) 110, the edge device(s) 112, and/or the edge VM(s) 115 hosted on the server/cluster 114. Each of the edge cluster(s) (e.g., or tenants) 110 may include a respective cluster of edge nodes or devices that are configured to host a respective edge stack 111. The edge stack 111 may be distributed across multiple edge nodes, devices, or VMs of a respective one of the edge cluster(s) 110, in some examples. Each of the edge device(s) 112 may be configured to host a respective edge stack 113. Each of the edge VM(s) 115 may be configured to host a respective edge stack 116. In some examples, the server/cluster 114 may be included as part of the central IoT computing system 140 or the data computing system 150. For clarity, "edge system" may refer to any of the edge cluster(s) 110, the edge device(s) 112, and/or the edge VM(s) 115 hosted on the server/cluster 114. The edge stacks (e.g., any of the edge stack 111, the edge stack 113, and/or the edge stack 116) may include software configured to operate the respective edge system in communication between one or more of the respective data sources (e.g., the data source(s) 120, the data source(s) 122, and/or the data source(s) 124). The software may include instructions that are stored on a computer readable medium (e.g., memory, disks, etc. that is executable by one or more processor units (e.g., central processor units (CPUs), graphic processor units (GPUs), tensor processing units (TPUs), hardware accelerators, video processing units (VPUs), etc.) to perform functions, methods, etc., described herein.

The data source(s) 120, the data source(s) 122, and the data source(s) 124 ("data sources") may each include one or more devices configured to receive and/or generate respective source data. The data sources may include sensors (e.g., electrical, temperature, matter flow, movement, position, biometric data, or any other type of sensor), cameras, transducers, any type of RF receiver, or any other type of device configured to receive and/or generate source data.

Each of the edge stacks may include one or more data pipelines and/or applications. In some examples, some data pipelines and/or applications may be configured to receive and process/transform source data from one or more of the data sources. In some examples, two or more data pipelines may be concatenated together such that one data pipeline receives and processes/transforms data output from another data pipeline. In some examples, a data pipeline may span across multiple edge systems. Each of the one or more data pipelines and/or applications may be configured to process respective received data based on respective algorithms or functions to provide transformed data. In some examples, the respective algorithms or functions may include machine learning (ML) or artificial intelligence (AI) algorithms, or any other user-specified or defined function or algorithm.

The data pipelines can be constructed using computing primitives and building blocks, such as VMs, containers, processes, or any combination thereof. In some examples, the data pipelines may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or REST API, with data ingestion and movement handled by connector components built into the data pipeline. Thus, data may be passed between containers of a data pipeline using API calls. Constructing data pipelines using data primitives and building blocks may reduce downtime impact of deployment and updates as compared with hard-coding a data pipeline in an application without explicitly separating ingest, processing, and data movement.

In some examples, the edge systems may cause transformed data from a data pipeline or an application of the one or more data pipelines or applications of the edge stacks to be provided to a respective data plane as edge data, such as the data plane 152 of the data computing system 150, using respective data plane communication interfaces, including application programming interfaces (APIs). The data computing system 150 may be a dedicated computing system, or may include a centralized analytics system hosted on a network of remote servers that are configured to store, manage, and process data (e.g., cloud computing system).

The one or more data pipelines or applications of the edge stacks may be implemented using a containerized architecture that is managed via a container orchestrator. The data pipelines and/or applications communicate using application programming interface (API) calls, in some examples.

The centralized IoT manager 142 hosted on the central IoT computing system 140 may be configured to centrally manage configuration of each of the edge systems and data sources via a central control plane. The central IoT computing system 140 may include one or more computing nodes configured to host the centralized IoT manager 142. In some examples, the centralized IoT manager 142 may be distributed across a cluster of computing nodes of the central IoT computing system 140.

In some examples, the centralized IoT manager 142 may be configured to manage, for each of the edge systems, network configuration and security protocols, installed software (e.g., including data pipelines and applications), connected data source(s) (e.g., including type, category, identifiers, data communication protocols, etc.), connected data plane(s), communication between the edge systems and users, etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

The centralized IoT manager 142 may be configured to generate (e.g., build, construct, update, etc.) and distribute data pipelines and applications to selected edge systems based on the configuration maintained for each edge system. In some examples, the centralized IoT manager 142 may facilitate creation of one or more project constructs and may facilitate association of a respective one or more edge systems with a particular project construct (e.g., in response to user input and/or in response to criteria or metadata of the particular project). Each edge systems may be associated with no project constructs, one project construct, or more than one project construct. A project construct may be associated with any number of edge systems. When a data pipeline is created, the centralized IoT manager 142 may assign the data pipeline to or associate the data pipeline with a respective one or more project constructs. In response to the assignment to or association with the respective one or more project constructs, the centralized IoT manager 142 may deploy the data pipeline to each edge system associated with the respective one or more project constructs.

For example, in response to a request for a new data pipeline associated with a particular type or category of data sources and/or a project construct, the centralized IoT manager 142 may identify data sources having the particular type or category (e.g., or attribute), and/or may identify respective edge systems are connected to the identified data sources of the particular type or category and/or are associated with the particular project construct. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system.

In response to receipt of a data pipeline, an edge system may be configured to determine whether to deploy the data pipeline for use based on whether relevant data sources and/or other relevant input data for the data pipeline are available to the edge system. Edge data may be provided from the edge systems to one or more respective data planes, such as the data plane 152 of the data cloud computing system 150, users, or other edge systems via the network 130. In some examples, the edge data may include some or all of the source data from one or more of the data sources, processed source data, data derived from the source data, combined source data, or any combination thereof. The data plane 152 may be configured to store the edge data, process the edge data, provide access to the edge data to clients, etc. The data computing system 150 may include one or more cloud platforms that includes a plurality of computing nodes configured to host one or more versions of the data plane 152.

In operation, the IoT system 100 may include any number and combination of data sources selected from the data source(s) 120, the data source(s) 122, and the data source(s) 124 that are each configured to provide respective source data. The data sources of the IoT system 100 may collectively span any type of geographic area (e.g., across continents, countries, states, cities, counties, facilities, buildings, floors, rooms, systems, units, or any combination thereof). The number of data sources may range in the tens, hundreds, thousands, or more. The data sources may include sensors (e.g., electrical, temperature, matter flow, movement, position, biometric data, or any other type of sensor), cameras, transducers, any type of RF receiver, or any other type of device configured to receive and/or generate source data.

Rather than each of the data sources independently sending all source data directly to a data plane or user, the IoT system 100 may include any number and combination of edge systems selected from any combination of the edge cluster(s) 110, the edge device(s) 112, and/or the edge VM(s) 115 hosted on the server/cluster 114 that are proximately located with and connected to respective data sources and are each configured to receive and select/process/transform the source data that is provided to the data plane or user. The edge systems within the IoT system 100 may include homogenous hardware and software architectures, in some examples. In other examples, the edge systems have a wide array of hardware and software architecture and capabilities. Each of the edge systems may be connected to a respective subset of data sources, and may host respective data pipelines and applications (e.g., included in the edge stacks, such as the edge stack 111, edge stack 113, or edge stack 116) that are configured to process source data from a respective one or more of the connected data sources and/or transformed data from other applications and/or data pipelines.

Each of the one or more data pipelines and/or applications may be configured to process and/or distribute respective transformed data based on received source data (e.g., or other edge data) using respective algorithms or functions. In some examples, the respective algorithms or functions may include machine learning (ML) or artificial intelligence (A) algorithms. In some examples, the algorithms or functions may include any other user-specified or defined function to process/transform/select/etc. received data. In some examples, an edge system may provide the transformed data from a data pipeline or an application of the one or more data pipelines or applications of the edge stacks to a respective destination data plane, such as the data plane 152 of the data computing system 150 as edge data. In some examples, the edge systems may be configured to share edge data with other edge systems. The one or more data pipelines or applications of the edge stacks may be implemented using a containerized architecture that is managed via a container orchestrator. The data pipelines and/or applications communicate using application programming interface (API) calls, in some examples.

The centralized IoT manager 142 hosted on the central IoT computing system 140 may be configured to centrally manage configuration of each of the edge systems and data sources. In some examples, the centralized IoT manager 142 may be configured to manage, for each of the edge systems, data sources, and/or users, network configuration and security protocols, installed software (e.g., including data pipelines and applications), connected data source(s) (e.g., including type, category, identifiers, data communication protocols, etc.), connected data plane(s), etc. The centralized IoT manager 142 may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

The centralized IoT manager 142 may be configured to generate or update and distribute data pipelines and applications to selected edge systems based on the configuration maintained for each edge system. For example, in response to a request for a new data pipeline or application associated with a particular type or category of data sources, the centralized IoT manager 142 may identify data sources having the particular type or category, and identify respective edge systems are connected to the identified data sources of the particular type or category. For each identified edge system, the centralized IoT manager 142 may generate a respective version of the application or data pipeline based on respective hardware configuration information for the edge system. That is, the centralized IoT manager 142 may independently generate the applications and data pipelines to efficiently operate according to the specific hardware configuration of each edge system. The data pipelines may be constructed using a group of containers (e.g., a pod) each configured to perform various functions within the data pipeline (e.g., subscriber, data processor, publisher, connectors that transform data for consumption by another container within the application or pod, etc.). In some examples, the centralized IoT manager 142 may be configured to define stages of a constructed data pipeline application using a user interface or representational state transfer (REST) API, with data ingestion and movement handled by the connector components built into the data pipeline.

Thus, each data pipeline may include one or more of connector containers configured to pass data into the data pipeline (e.g., subscriber containers), pass data out from the data pipeline (e.g., publisher containers), or transform data for processing or output (e.g., transformation containers). For example, the transformation containers may be configured to transform data using a particular runtime environment (e.g., Python, Java, etc.) to apply a respective function or algorithm to received source data to provide the transformed data. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers.

The edge systems may provide the edge data to one or more respective data planes, such as the data plane 152 of the data computing system 150, via the network 130. In some examples, the edge stacks may be configured to implement respective data plane communication interfaces, including application programming interfaces (APIs), to communicate with the one or more data planes. The data plane 152 may be configured to store the edge data, process the edge data, aggregate the edge data across the IoT system 100, provide access to the edge data to clients, or any combination thereof. The edge data received and processed at the data plane 152 may provide insight into events, trends, health, etc., of the IoT system 100 based in data captured by the data sources.

Figure 2:
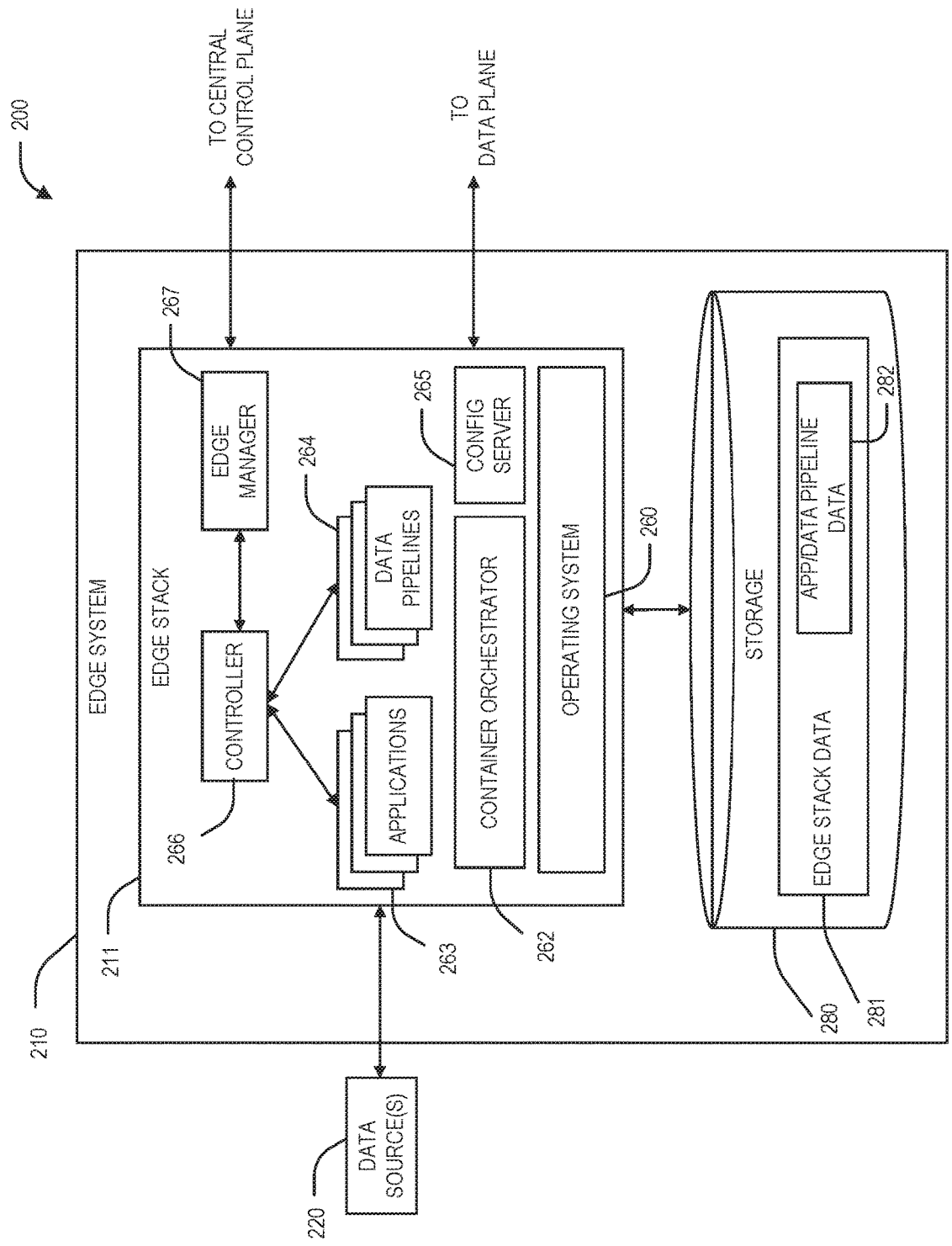
FIG. 2 is a block diagram of an edge computing system of an IoT system, in accordance with an embodiment of the present disclosure.

FIG. 2 is a block diagram of an edge computing system 200 of an IoT system, in accordance with an embodiment of the present disclosure. The edge computing system 200 may include an edge device/cluster/VM (edge system) 210 configured to host an edge stack 211 and storage 280. Any of the edge cluster(s) 110, the edge device(s) 112, and/or the edge VM(s) 115 of FIG. 1 may implement a respective version of the edge system 210. Any of the edge stack 111, the edge stack 113, and/or the edge stack 116 of FIG. 1 may implement some or all of the edge stack 211.

In some examples, the edge system 210 may include a respective cluster of computing nodes or devices that are configured to host a respective edge stack 211, with the edge stack 211 distributed across multiple computing nodes, devices, or VMs of the edge system 210. In some examples, the edge system 210 may be a single computing device configured to host the edge stack 211. In some examples, the edge system 210 may include a VM hosted on a server (e.g., or other host machine) that is configured to host the edge stack 211.

The storage 280 may be configured to store edge stack data 281, such as software images, binaries and libraries, metadata, etc., to be used by the edge system 210 to load and execute the edge stack. In some examples, the edge stack data 281 includes instructions that when executed by a process or the edge system 210, causes the edge system to perform functions described herein. The storage may include local storage (solid state drives (SSDs), hard disk drives (HDDs), flash or other non-volatile memory, volatile memory, or any combination thereof), cloud storage, networked storage, or any combination thereof.

The edge stack 211 includes a package hosted on a physical layer of the edge system 210 to facilitate communication with one or more data source(s) 220, other edge systems, a centralized IoT manager (e.g., the centralized IoT manager 142 of FIG. 1) via a control plane, and/or a data plane (e.g., the data plane 152 of FIG. 1). The data source(s) 220 may each include one or more devices configured to receive and/or generate respective source data. The data source(s) 220 may include sensors (e.g., electrical, temperature, matter flow, movement, position, biometric data, or any other type of sensor), cameras, transducers, any type of RF receiver, or any other type of device configured to receive and/or generate source data.

The edge stack 211 may host an underlying operating system 260 configured to interface the physical layer of the edge system 210. In some examples, a controller 266, an edge manager 267, a container orchestrator 262, and a configuration server 265 may run on the operating system 260. In some examples, the edge stack 211 may include a bare metal implementation that runs the operating system 260 directly on the physical layer. In other examples, the edge stack 211 may include a virtualized implementation with a hypervisor running on the physical layer and the operating system 260 running on the hypervisor.

The container orchestrator 262 may be configured to manage a containerized architecture of one or more applications 263 and/or one or more data pipelines 264. In some examples, the container orchestrator 262 may include Kubernetes® container orchestration software.

The edge manager 267 may communicate with the centralized IoT manager via the control plane to receive network configuration and communication information, data plane information, software packages for installation (e.g., including the applications 263 and the data pipelines 264), data source connectivity information, etc. In some examples, the edge manager 267 may also be configured to provide configuration and status information to the centralized IoT manager, including status information associated with one or more of the data source(s) 220.

In response to information received from the centralized IoT manager, the edge manager 267 may be configured to provide instructions to the controller 266 to manage the applications 263 and/or the data pipelines 264, which may include causing installation or upgrading of one of the applications 263 and/or the data pipelines 264, removing one of the applications 263 and/or the data pipelines 264, starting or stopping new instances of the applications 263 or the data pipelines 264, allocating hardware resources to each of the applications 263 and/or the data pipelines 264, or any combination thereof. The edge stack data 281 may include application and data pipeline data 282 that includes data specific to the respective applications 263 and/or the data pipelines 264 to facilitate execution.

As previously described, the applications 263 and the data pipelines 264 may be implemented using a containerized architecture to receive source data from one or more of the data source(s) 220 (e.g., or from others of the applications 263 and/or the data pipelines 264) and to provide respective transformed data at an output by applying a respective function or algorithm to the received source data. In some examples, the respective algorithms or functions may include machine learning (ML) or artificial intelligence (AI) algorithms or any other user-specified or defined function or algorithm. In some examples, the applications 263 and the data pipelines 264 may be constructed from other computing primitives and building blocks, such as VMs, processes, etc., or any combination of containers, VMs, processes, etc. The applications 263 and data pipelines 264 may each be formed in a respective "sandbox" and may include a group of containers that communicate with each other via a virtual intra-"sandbox" network (e.g., a pod).

In some examples, the data pipelines 264 may be constructed using a group of containers (e.g., a pod) that each perform various functions within the data pipeline 264 (e.g., subscriber, data processor, publisher, connectors that transform data for consumption by another container within the application or pod, etc.) In some examples, the definition of stages of a constructed data pipeline 264 application may be described using a user interface or REST API, with data ingestion and movement handled by connector components built into the data pipeline. Thus, data may be passed between containers of a data pipeline 264 using API calls.

In some examples, the applications 263 and/or the data pipelines 264 may cause the edge data to be provided to a respective destination data plane (e.g., such as the data plane 152 of FIG. 1) or to another edge device via the edge manager 267.

In some examples, the configuration server 265 may be configured to bootstrap the edge stack 211 for connection to a central control plane (e.g., to communicate with the centralized IoT manager) during initial deployment of the edge system 210.

In operation, the edge stack 211 hosted on the edge system 210 may control operation of the edge system 210 with an IoT system to facilitate communication with one or more data source(s) 220 and/or a data plane based on instructions provided from a centralized IoT manager via a control plane. The edge manager 267 of the edge stack 211 may communicate with the centralized IoT manager via the control plane to send configuration and/or status information (e.g., of the edge system 210 and/or one or more of the data source(s) 220) and/or to receive network configuration and communication information, data plane information, software packages for installation (e.g., including the applications 263 and the data pipelines 264), data source connectivity information, etc. In response to information received from the centralized IoT manager, the edge manager 267 may be configured to provide instructions to the controller 266 to manage the applications 263 and/or the data pipelines 264, which may include causing installation or upgrading of one of the applications 263 and/or the data pipelines 264, removing one of the applications 263 and/or the data pipelines 264, starting or stopping new instances of the applications 263 or the data pipelines 264, allocating hardware resources to each of the applications 263 and/or the data pipelines 264, storing data in and/or retrieving data from the edge stack data 281 and/or the application and data pipeline data 282 of the storage 280, or any combination thereof.

The applications 263 and the data pipelines 264 may receive source data from one or more of the data source(s) 220 (e.g., or from others of the applications 263 and/or the data pipelines 264) and to provide respective transformed data at an output by applying a respective function or algorithm to the received source data. In some examples, the respective algorithms or functions may include machine learning (ML) or artificial intelligence (AI) algorithms. In some examples, the applications 263 and/or the data pipelines 264 may cause the received and/or processed source data to be provided to a respective destination data plane (e.g., such as the data plane 152 of FIG. 1) via the configuration server 265. In some examples, the applications 263 and/or the data pipelines 264 may be implemented using a containerized architecture deployed and managed by the container orchestrator 262. Thus, the container orchestrator 262 may deploy, start, stop, and manage communication with the applications 263 and/or the data pipelines 264 within the edge stack 211.

The edge stack 211 may interface with one or more respective data planes (e.g., or other edge systems) to send data from and receive data at the edge system 210 using respective data plane communication interfaces, including APIs. Thus, the edge stack 211 may route transformed data from the applications 263 and/or the data pipelines 264 to a data plane (e.g., or another edge system) as edge data.

Figure 3:
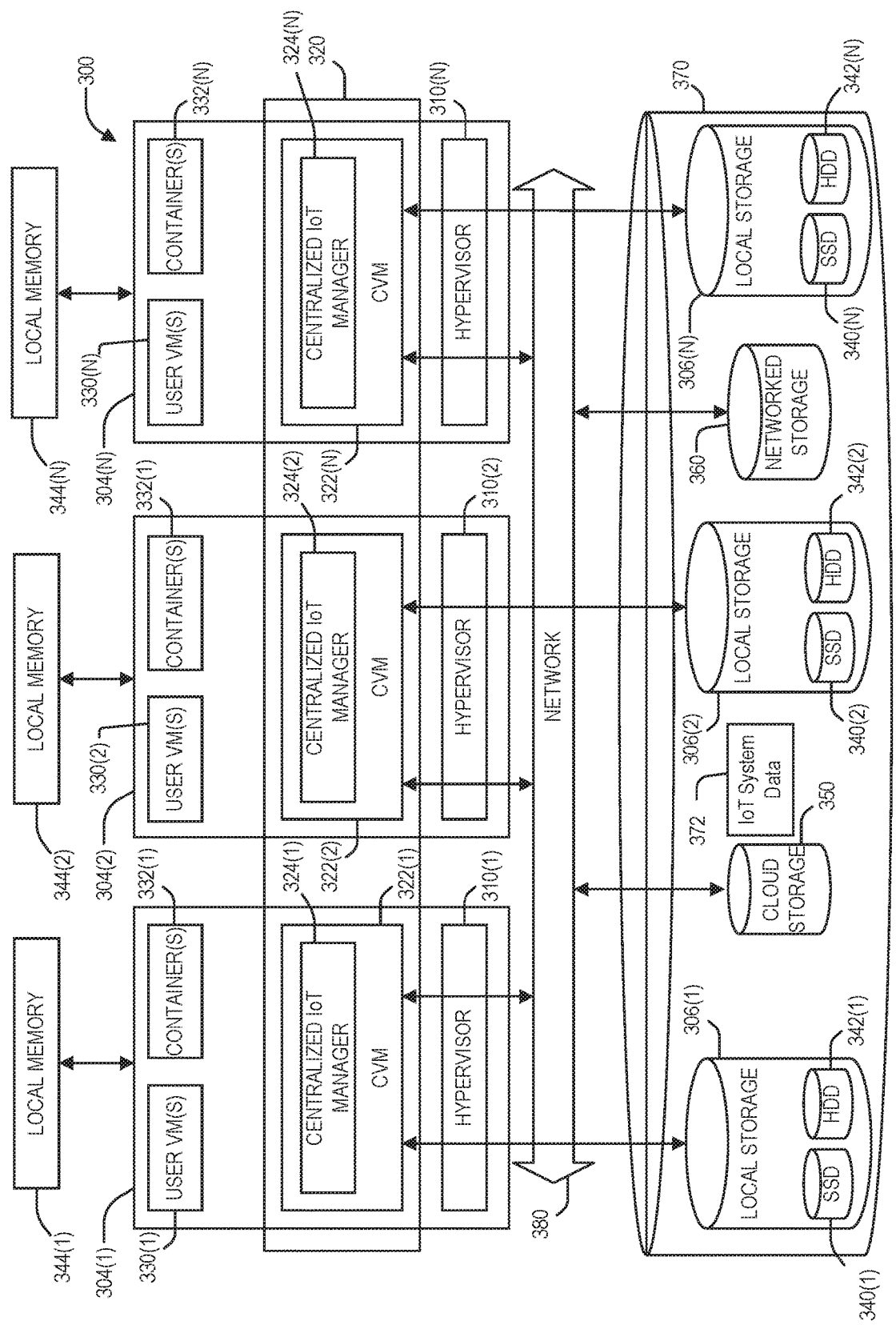
FIG. 3 is a block diagram of a distributed computing system, in accordance with an embodiment of the present disclosure.

FIG. 3 is a block diagram of a distributed computing system 300, in accordance with an embodiment of the present disclosure. The distributed computing system 300 generally includes computing nodes (e.g., host machines, servers, computers, nodes, etc.) 304(1)-(N) and storage 370 connected to a network 380. While FIG. 3 depicts three computing nodes, the distributed computing system 300 may include two or more than three computing nodes without departing from the scope of the disclosure. The network 380 may be any type of network capable of routing data transmissions from one network device (e.g., computing nodes 304(1)-(N) and the storage 370) to another. For example, the network 380 may be a local area network (LAN), wide area network (WAN), intranet, Internet, or any combination thereof. The network 380 may be a wired network, a wireless network, or a combination thereof. The central IoT computing system 140 of FIG. 1 may be configured to implement the distributed computing system 300, in some examples.

The storage 370 may include respective local storage 306(1)-(N), cloud storage 350, and networked storage 360. Each of the respective local storage 306(1)-(N) may include one or more solid state drive (SSD) devices 340(1)-(N) and one or more hard disk drives (HDD)) devices 342(1)-(N). Each of the respective local storage 306(1)-(N) may be directly coupled to, included in, and/or accessible by a respective one of the computing nodes 304(1)-(N) without communicating via the network 380. The cloud storage 350 may include one or more storage servers that may be stored remotely to the computing nodes 304(1)-(N) and may be accessed via the network 380. The cloud storage 350 may generally include any type of storage device, such as HDDs, SSDs, optical drives, etc. The networked storage (or network-accessed storage) 360 may include one or more storage devices coupled to and accessed via the network 380. The networked storage 360 may generally include any type of storage device, such as HDDs, SSDs, optical drives, etc. In various embodiments, the networked storage 360 may be a storage area network (SAN).

Each of the computing nodes 304(1)-(N) may include a computing device configured to host a respective hypervisor 310(1)-(N), a respective controller virtual machine (CVM) 322(1)-(N), respective user (or guest) virtual machines (VMs) 330(1)-(N), and respective containers 332(1)-(N). For example, each of the computing nodes 304(1)-(N) may be or include a server computer, a laptop computer, a desktop computer, a tablet computer, a smart phone, any other type of computing device, or any combination thereof. Each of the computing nodes 304(1)-(N) may include one or more physical computing components, such as one or more processor units, respective local memory 344(1)-(N) (e.g., cache memory, dynamic random-access memory (DRAM), non-volatile memory (e.g., flash memory), or combinations thereof), the respective local storage 306(1)-(N), ports (not shown) to connect to peripheral input/output (I/O) devices (e.g., touchscreens, displays, speakers, keyboards, mice, cameras, microphones, environmental sensors, etc.).

Each of the user VMs 330(1)-(N) hosted on the respective computing node includes at least one application and everything the user VM needs to execute (e.g., run) the at least one application (e.g., system binaries, libraries, etc.). Each of the user VMs 330(1)-(N) may generally be configured to execute any type and/or number of applications, such as those requested, specified, or desired by a user. Each of the user VMs 330(1)-(N) further includes a respective virtualized hardware stack (e.g., virtualized network adaptors, virtual local storage, virtual memory, processor units, etc.). To manage the respective virtualized hardware stack, each of the user VMs 330(1)-(N) is further configured to host a respective operating system (e.g., Windows®, Linux®, etc.). The respective virtualized hardware stack configured for each of the user VMs 330(1)-(N) may be defined based on available physical resources (e.g., processor units, the local memory 344(1)-(N), the local storage 306(1)-(N), etc.). That is, physical resources associated with a computing node may be divided between (e.g., shared among) components hosted on the computing node (e.g., the hypervisor 310(1)-(N), the CVM 322(1)-(N), other user VMs 330(1)-(N), the containers 332(1)-(N), etc.), and the respective virtualized hardware stack configured for each of the user VMs 330(1)-(N) may reflect the physical resources being allocated to the user VM. Thus, the user VMs 330(1)-(N) may isolate an execution environment my packaging both the user space (e.g., application(s), system binaries and libraries, etc.) and the kernel and/or hardware (e.g., managed by an operating system). While FIG. 3 depicts the computing nodes 304(1)-(N) each having multiple user VMs 330(1)-(N), a given computing node may host no user VMs or may host any number of user VMs.

Rather than providing hardware virtualization like the user VMs 330(1)-(N), the respective containers 332(1)-N) may each provide operating system level virtualization. Thus, each of the respective containers 332(1)-(N) is configured to isolate the user space execution environment (e.g., at least one application and everything the container needs to execute (e.g., run) the at least one application (e.g., system binaries, libraries, etc.)) without requiring a hypervisor to manage hardware. Individual ones of the containers 332(1)-(N) may generally be provided to execute any type and/or number of applications, such as those requested, specified, or desired by a user. Two or more of the respective containers 332(1)-(N) may run on a shared operating system, such as an operating system of any of the hypervisor 310(1)-(N), the CVM 322(1)-(N), or other user VMs 330(1)-(N). In some examples, an interface engine may be installed to communicate between a container and an underlying operating system. While FIG. 3 depicts the computing nodes 304(1)-(N) each having multiple containers 332(1)-(N), a given computing node may host no containers or may host any number of containers.

Each of the hypervisors 310(1)-(N) may include any type of hypervisor. For example, each of the hypervisors 310(1)-(N) may include an ESX, an ESX(i), a Hyper-V, a KVM, or any other type of hypervisor. Each of the hypervisors 310(1)-(N) may manage the allocation of physical resources (e.g., physical processor units, volatile memory, the storage 370) to respective hosted components (e.g., CVMs 322(1)-(N), respective user VMs 330(1)-(N), respective containers 332(1)-(N)) and performs various VM related operations, such as creating new VMs, cloning existing VMs, etc. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. Collectively, the hypervisors 310(1)-(N) may all include a common hypervisor type, may all include different hypervisor types, or may include any combination of common and different hypervisor types.

The CVMs 322(1)-(N) may provide services the respective user VMs 330(1)-(N), and/or the respective containers 332(1)-(N) hosted on a respective computing node of the computing nodes 304(1)-(N). For example, each of the CVMs 322(1)-(N) may execute a variety of software and/or may serve the I/O operations for the respective hypervisor 310(1)-(N), the respective user VMs 330(1)-(N), and/or the respective containers 332(1)-(N) hosted on the respective computing node 304(1)-(N). The CVMs 322(1)-(N) may communicate with one another via the network 380. By linking the CVMs 322(1)-(N) together via the network 380, a distributed network (e.g., cluster, system, etc.) of the computing nodes 304(1)-(N) may be formed. In an example, the CVMs 322(1)-(N) linked together via the network 380 may form a distributed computing environment (e.g., a distributed virtualized file server) 320 configured to manage and virtualize the storage 370. In some examples, a SCSI controller, which may manage the SSD devices 340(1)-(N) and/or the HDD devices 342(1)-(N) described herein, may be directly passed to the respective CVMs 322(1)-(N), such as by leveraging a VM-Direct Path. In the case of Hyper-V, the SSD devices 340(1)-(N) and/or the HDD devices 342(1)-(N) may be passed through to the respective CVMs 322(1)-(N).

The CVMs 322(1)-(N) may coordinate execution of respective services over the network 380, and the services running on the CVMs 322(1)-(N) may utilize the local memory 344(1)-(N) to support operations. The local memory 344(1)-(N) may be shared by components hosted on the respective computing node 304(1)-(N), and use of the respective local memory 344(1)-(N) may be controlled by the respective hypervisor 310(1)-(N). Moreover, multiple instances of the same service may be running throughout the distributed system 300. That is, the same services stack may be operating on more than one of the CVMs 322(1)-(N). For example, a first instance of a service may be running on the CVM 322(1), a second instance of the service may be running on the CVM 322(2), etc.

In some examples, the CVMs 322(1)-(N) may be configured to collectively manage a centralized IoT manager of an IoT system, with each of the CVMs 322(1)-(N) hosting a respective centralized IoT manager instances 324(1)-(N) on an associated operating system to form the centralized IoT manager. In some examples, one of the centralized IoT manager instances 324(1)-(N) may be designated as a master centralized IoT manager instance configured to coordinate collective operation of the centralized IoT manager instances 324(1)-(N). The centralized IoT manager instances 324(1)-(N) may be configured to manage configuration of (e.g., network connectivity information, connected data sources, installed application and other software versions, data pipelines, etc.), as well as generate and distribute data pipelines to edge systems (e.g., any of an edge device of the edge cluster(s) 110, the edge device(s) 112, the edge VM(s) 115 of the server/cluster 114, etc.) of an IoT system centrally manage operation of the IoT system. The centralized IoT manager instances 324(1)-(N) may be configured to interface with multiple edge system types and interfaces via a control plane. To manage the operation of the IoT system, the centralized IoT manager instances 324(1)-(N) may retrieve data from and store data to IoT system data 372 of the storage 370. The IoT system data 372 may include metadata and other data corresponding to each edge system, data source, user, site, etc. within the IoT system. For example, the IoT system data 372 may include hardware configurations, software configurations, network configurations, edge system and/or data source type, categories, geographical and physical locations, authentication information, associations between edge systems and data sources, associations between edge systems and users, user access permissions, etc., or any combination thereof.

Generally, the CVMs 322(1)-(N) may be configured to control and manage any type of storage device of the storage 370. The CVMs 322(1)-(N) may implement storage controller logic and may virtualize all storage hardware of the storage 370 as one global resource pool to provide reliability, availability, and performance. IP-based requests may be generally used (e.g., by the user VMs 330(1)-(N) and/or the containers 332(1)-(N)) to send I/O requests to the CVMs 322(1)-(N). For example, the user VMs 330(1) and/or the containers 332(1) may send storage requests to the CVM 322(1) using an IP request, the user VMs 330(2) and/or the containers 332(2) may send storage requests to the CVM 322(2) using an IP request, etc. The CVMs 322(1)-(N) may directly implement storage and I/O optimizations within the direct data access path.

Note that the CVMs 322(1)-(N) provided as virtual machines utilizing the hypervisors 310(1)-(N). Since the CVMs 322(1)-(N) run "above" the hypervisors 310(1)-(N), some of the examples described herein may be implemented within any virtual machine architecture, since the CVMs 322(1)-(N) may be used in conjunction with generally any type of hypervisor from any virtualization vendor.

Virtual disks (vDisks) may be structured from the storage devices in the storage 370. A vDisk generally refers to the storage abstraction that may be exposed by the CVMs 322(1)-(N) to be used by the user VMs 330(1)-(N) and/or the containers 332(1)-(N). Generally, the distributed computing system 300 may utilize an IP-based protocol, such as an Internet small computer system interface (iSCSI) or a network file system interface (NFS), to communicate between the user VMs 330(1)-(N), the containers 332(1)-(N), the CVMs 322(1)-(N), and/or the hypervisors 310(1)-(N). Thus, in some examples, the vDisk may be exposed via an iSCSI or a NFS interface, and may be mounted as a virtual disk on the user VMs 330(1)-(N) and/or operating systems supporting the containers 332(1)-(N). iSCSI may generally refer to an IP-based storage networking standard for linking data storage facilities together. By carrying SCSI commands over IP networks, iSCSI can be used to facilitate data transfers over intranets and to manage storage over any suitable type of network or the Internet. The iSCSI protocol may allow iSCSI initiators to send SCSI commands to iSCSI targets at remote locations over a network. NFS may refer to an IP-based file access standard in which NFS clients send file-based requests to NFS servers via a proxy folder (directory) called "mount point".

During operation, the user VMs 330(1)-(N) and/or operating systems supporting the containers 332(1)-(N) may provide storage input/output (I/O) requests to the CVMs 322(1)-(N) and/or the hypervisors 310(1)-(N) via iSCSI and/or NFS requests. Each of the storage I/O requests may designate an IP address for a CVM of the CVMs 322(1)-(N) from which the respective user VM desires I/O services. The storage I/O requests may be provided from the user VMs 330(1)-(N) to a virtual switch within a hypervisor of the hypervisors 310(1)-(N) to be routed to the correct destination. For examples, the user 330(1) may provide a storage request to the hypervisor 310(1). The storage I/O request may request I/O services from a CVM of the CVMs 322(1)-(N). If the storage I/O request is intended to be handled by a respective CVM of the CVMs 322(1)-(N) hosted on a same respective computing node of the computing nodes 304(1)-(N) as the requesting user VM (e.g., CVM 322(1) and the user VM 330(1) are hosted on the same computing node 304(1)), then the storage I/O request may be internally routed within the respective computing node of the computing node of the computing nodes 304(1)-(N). In some examples, the storage I/O request may be directed to respective CVM of the CVMs 322(1)-(N) on another computing node of the computing nodes 304(1)-(N) as the requesting user VM (e.g., CVM 322(1) is hosted on the computing node 304(1) and the user VM 330(2) is hosted on the computing node 304(2)). Accordingly, a respective hypervisor of the hypervisors 310(1)-(N) may provide the storage request to a physical switch to be sent over the network 380 to another computing node of the computing nodes 304(1)-(N) hosting the requested CVM of the CVMs 322(1)-(N).

The CVMs 322(1)-(N) may collectively manage the storage I/O requests between the user VMs 330(1)-(N) and/or the containers 332(1)-(N) of the distributed computing system and a storage pool that includes the storage 370. That is, the CVMs 322(1)-(N) may virtualize I/O access to hardware resources within the storage pool. In this manner, a separate and dedicated CVM of the CVMs 322(1)-(N) may be provided each of the computing nodes 304(1)-(N) the distributed computing system 300. When a new computing node is added to the distributed computing system 300, it may include a respective CVM to share in the overall workload of the distributed computing system 300 to handle storage tasks. Therefore, examples described herein may be advantageously scalable, and may provide advantages over approaches that have a limited number of controllers. Consequently, examples described herein may provide a massively-parallel storage architecture that scales as and when computing nodes are added to the system.

The distributed system 300 may include a centralized IOT manager that includes one or more of the centralized IoT manager instances 324(1)-(N) hosted on the CVMs 322(1)-(N). The centralized IoT manager may be configured to centrally manage configuration of edge systems and data sources of the corresponding IoT system. In some examples, the centralized IoT manager may be configured to manage, for each of the edge systems, data sources, and/or users, network configuration and security protocols, installed software (e.g., including data pipelines and applications), connected data source(s) (e.g., including type, category, identifiers, data communication protocols, etc.), connected data plane(s), etc. The centralized IoT manager may maintain configuration information for each of the edge systems, data sources, associated users, including hardware configuration information, installed software version information, connected data source information (e.g., including type, category, identifier, etc.), associated data planes, current operational status, authentication credentials and/or keys, etc.

In some examples, a workload of the centralized IoT manager may be distributed across two or more of the computing nodes 304(1)-(N) via the respective centralized IoT manager instances 324(1)-(N). In other examples, the workload of the centralized IoT manager may reside in a single one of the centralized IoT manager instances 324(1)-(N). A number of centralized IoT manager instances 324(1)-(N) running on the distributed computing system 300 may depend on a size of the management workload associated with the IoT system (e.g., based on a number of edge systems, data sources, users, etc., level of activity within the IoT system, frequency of updates, etc.), as well as compute resources available on each of the computing nodes 304(1)-(N). One of the centralized IoT manager instances 324(1)-(N) may be designated a master centralized server manager that is configured to monitor workload of the centralized IoT manager instances 324(1)-(N), and based on the monitored workload, allocate management of respective edge systems and users to each of the centralized IoT manager instances 324(1)-(N) and start additional centralized IoT manager instances when compute resources available to the centralized IoT manager have fallen below a defined threshold. Thus, while FIG. 3 depicts each of the CVMs 322(1)-(N) hosting a respective one of the centralized IoT manager instances 324(1)-(N), it is appreciated that some of the CVMs 322(1)-(N) may not have an active centralized IoT manager instances 324(1)-(N) running without departing from the scope of the disclosure.

In some examples, the centralized IoT manager may be configured to generate or update and distribute data pipelines and applications to selected edge systems based on the configuration maintained for each edge system. In some examples, the centralized IoT manager may facilitate creation of one or more project constructs and may facilitate association of a respective one or more edge systems with a particular project construct (e.g., in response to user input and/or in response to criteria or metadata of the particular project). Each edge systems may be associated with no project constructs, one project construct, or more than one project construct. A project construct may be associated with any number of edge systems. When a data pipeline is created, the centralized IoT manager may assign the data pipeline to or associate the data pipeline with a respective one or more project constructs. In response to the assignment to or association with the respective one or more project constructs, the centralized IoT manager 142 may deploy the data pipeline to each edge system associated with the respective one or more project constructs.

For example, in response to a request for a new data pipeline or application associated with a particular type or category of data sources and/or a project construct, the centralized IoT manager may identify data sources having the particular type or category (e.g., or attribute, and/or may identify respective edge systems are connected to the identified data sources of the particular type or category and/or are associated with the particular project construct. For each identified edge system, the centralized IoT manager may generate a respective version of the application or data pipeline based on respective hardware configuration information for the edge system. That is, the centralized IoT manager may independently generate the applications and data pipelines to efficiently operate according to the specific hardware configuration of each edge system.

Each data pipeline may be formed in a respective "sandbox" and include a group of containers that communicate with each other via a virtual intra-"sandbox" network (e.g., a pod). Thus, each data pipeline may include one or more of connector containers configured to pass data into the data pipeline (e.g., subscriber containers), pass data out from the data pipeline (e.g., publisher containers), or transform data for processing or output (e.g., transformation containers). For example, the transformation containers may be configured to transform data using a particular runtime environment (e.g., Python, Java, etc.) to apply a respective function or algorithm to received source data to provide the transformed data. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers.

Once constructed, the centralized IoT manager may deploy the data pipeline to one or more respective edge systems via a secure connection. Constructing data pipelines using data primitives and building blocks may reduce downtime impact of deployment and updates as compared with hard-coding a data pipeline in an application without explicitly separating ingest, processing, and data movement. And deploying the data pipelines on an "as-needed" basis to each edge system may reduce wasted compute resource consumption at the edge systems and limit network traffic and downtime when updates are implemented.

Figure 4:
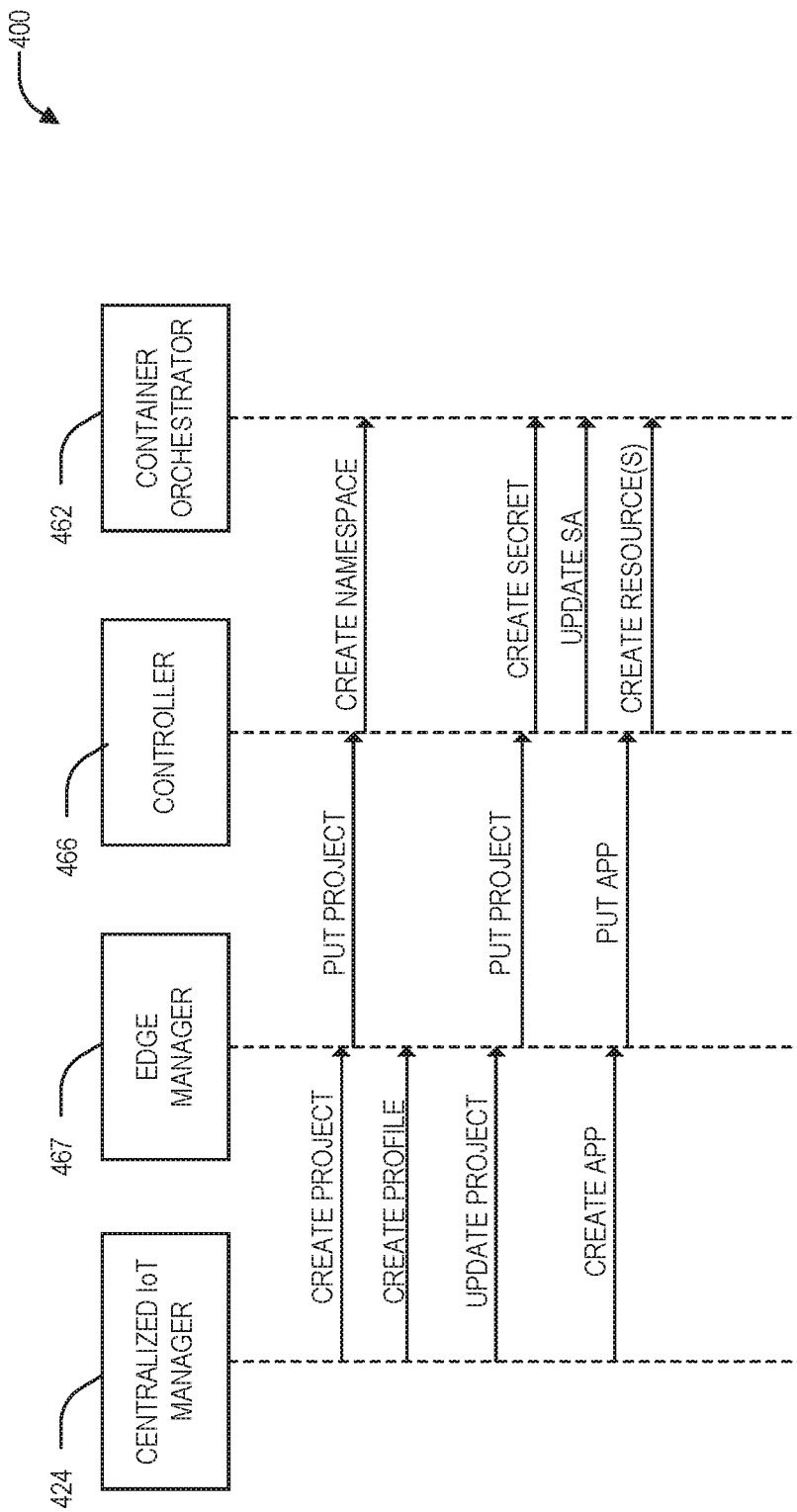
FIG. 4 is a sequence diagram to deploy a data pipeline, in accordance with an embodiment of the present disclosure.

FIG. 4 is a sequence diagram 400 to deploy a data pipeline, in accordance with an embodiment of the present disclosure. The sequence diagram of FIG. 4 may be performed via the IoT system of FIG. 1. The centralized IoT manager 424 may instruct an edge system hosting an edge stack that includes an edge manager 467, a controller 466, and a container orchestrator 462 to create a project and load an application or data pipeline into the project. The centralized IoT manager 142 of FIG. 1 and/or one or more of the centralized IoT manager instances 324(1)-(N) may implement the centralized IoT manager 424. Any of the edge stacks 111, 113, and/or 116 of FIG. 1 and/or the edge manager 267 of FIG. 2 may implement the edge manager 467. Any of the edge stacks 111, 113, and/or 116 of FIG. 1 and/or the controller 266 of FIG. 2 may implement the controller 466. Any of the edge stacks 111, 113, and/or 116 of FIG. 1 and/or the container orchestrator 262 of FIG. 2 may implement the container orchestrator 462.

The centralized IoT manager 424 may send a CREATE PROJECT message to the edge manager 467 to instruct the edge manager 467 to create a project on the corresponding edge system. A project may be used to define a group of applications or data pipelines for a particular purpose. In response, the edge manager 467 may send a PUT PROJECT message to the controller 466 to instruct creation of the project. In response, the controller 466 may send a CREATE NAMESPACE message to the container orchestrator 462 to instruct the container orchestrator 462 to create a space for the project. The space for the project may server to communicatively isolate data pipelines within a project from data pipelines and containers outside the project.

The centralized IoT manager 424 may send a CREATE PROFILE message to the edge manager 467 to instruct the edge manager 467 to create a security profile for transferring data across the network. Subsequently, the centralized IoT manager 424 may send an UPDATE PROJECT message to the edge manager 467 to instruct the edge manager 467 to update the project to include a security profile for transferring data across the network. In response, the edge manager 467 may send a PUT PROJECT message to the controller 466 to instruct creation of a secret. In response, the controller 466 may send a CREATE SECRET message to the container orchestrator 462 to instruct the container orchestrator 462 to create a secret (e.g., a key or other authentication code). Subsequently, the controller 466 may send an UPDATE SA (secure authorization) message to the container orchestrator 462 to instruct the container orchestrator 462 to create a secret (e.g., a key or other authentication code).

The centralized IoT manager 424 may send a CREATE APP message to the edge manager 467 to instruct the edge manager 467 to create an application or data pipeline on the corresponding edge system. In response, the edge manager 467 may send a PUT APP message to the controller 466 to instruct the controller 466 to create the application or data pipeline. In response, the controller 466 may send a CREATE RESOURCE(S) message to the container orchestrator 462 to instruct the container orchestrator 462 to create the resources necessary to host the application or data pipeline.

Figure 5:
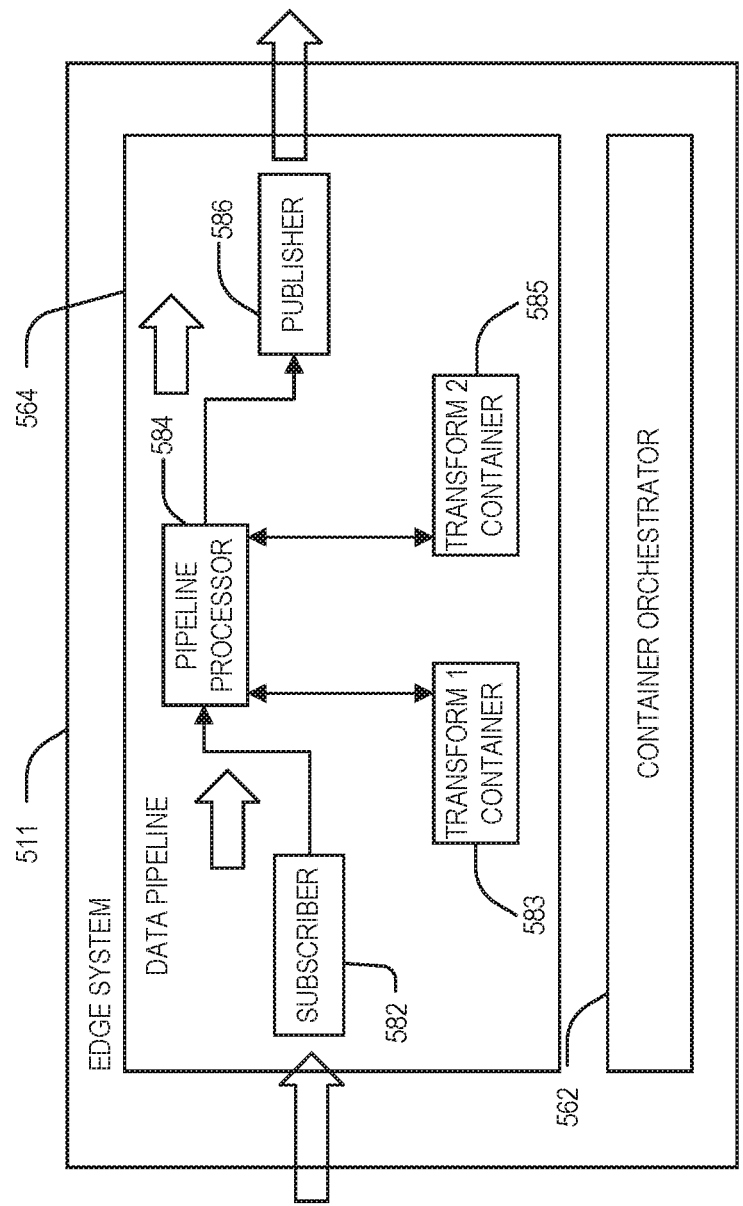
FIG. 5 is a block diagram of an edge computing device with an edge stack that includes a data pipeline, in accordance with an embodiment of the present disclosure.

FIG. 5 is a block diagram of an edge system 500 hosting an edge stack 511 having a data pipeline 564, in accordance with an embodiment of the present disclosure. Any of the edge cluster(s) 110, the edge device(s) 112, or the server/cluster 114 of FIG. 1, the edge computing system 200 of FIG. 2, an edge system configured host the edge manager 467, the controller 466, or the container orchestrator 462 of FIG. 4 may implement the edge system 500.

The edge stack 511 may host the data pipeline 564 that is managed by a container orchestrator 562. The data pipeline 564 may include a series of components that are configured to pass a message from one component to the next such that it includes a chronologically ordered stream of messages. The data pipeline 564 may be configured to receive to input data, such as source data (e.g., from one of the data source(s) 120, 122 or 124 of FIG. 1 and/or the data source(s) 220 of FIG. 2) or data from another data pipeline.

The data pipeline 564 can be constructed using computing primitives and building blocks, such as VMs, containers, processes, or any combination thereof. In some examples, the stages of the data pipeline 564 may be described using a user interface or REST API, with data ingestion and movement handled by connector components built into the data pipeline 564. Thus, data may be passed between containers of a data pipeline using API calls. As depicted in FIG. 5, the data pipeline 564 may include a group of containers to form a pod that includes a subscriber 582, a first transformation container 583, a pipeline processor 584, a second transformation container 585, and a publisher 586 each configured to perform various functions within the data pipeline 564 to consume, transform, and produce messages or data.

For example, the pipeline processor 584 may be configured to manage messaging between the subscriber 582, the first transformation container 583, the second transformation container 585, and the publisher 586. In some examples, the subscriber 582, the first transformation container 583, the second transformation container 585, and the publisher 586 may all provide acknowledge messages back to the pipeline processor 584 in response to receipt of messages. Thus, the second transformation container 585 may act as a message broker within the data pipeline 564.

The subscriber 582 is configured to receive messages of a certain topic from a message system and to provide the received message to the pipeline processor 584. The message may include source data or data from another data pipeline.

The first transformation container 583 may be configured to receive messages from the pipeline processor 584 (e.g. provided by the subscriber 582 and/or the second transformation container 585) and is configured to transform the message data using a first runtime environment (e.g., Python, Java, etc.) to apply a respective function or algorithm to received source data to provide the transformed data. The first transformation container 583 is further configured to provide the transformed data in a message back to the pipeline processor 584. Similar to the first transformation container 583, the second transformation container 585 may be configured to receive messages from the pipeline processor 584 (e.g. provided by the subscriber 582 and/or the second transformation container 585) and is configured to transform the message data using a second runtime environment (e.g., Python, Java, etc.) to apply a respective function or algorithm to received source data to provide the transformed data. The second transformation container 585 is further configured to provide the transformed data in a message back to the pipeline processor 584. In some examples, the first transformation container 583 and the second transformation container 585 may be configured to apply common functions or algorithms in different runtime environments. In other examples, the first transformation container 583 and the second transformation container 585 may be configured to apply a different functions or algorithms in the different runtime environments. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers). More or fewer than two transformation containers may be included in the data pipeline 564 without departing from the scope of the disclosure.

The publisher 586 is configured to receive messages from the pipeline processor 584 and is configured to publish the messages to a certain topic of a message system, to local data services, and/or to a data plane (e.g., to a remote or cloud computing system). The topic may be subscribed to by other data pipelines to further process the data and/or a configuration server to provide the output data to a data plane.

Figure 6:
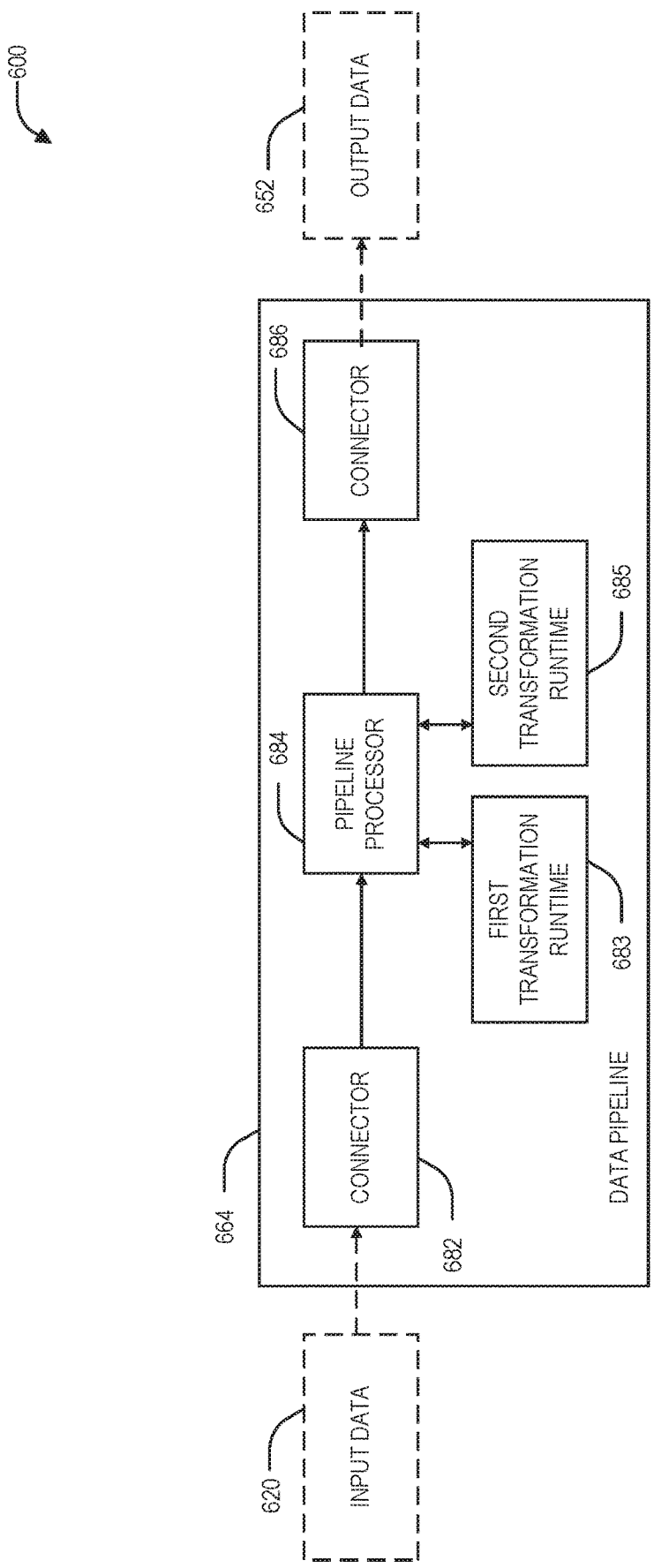
FIG. 6 is a block diagram illustrating a data pipeline of an edge system, in accordance with an embodiment of the present disclosure.

FIG. 6 is a block diagram illustrating a data pipeline 664 of an edge system 600, in accordance with an embodiment of the present disclosure. Any of the edge cluster(s) 110, the edge device(s) 112, or the server/cluster 114 of FIG. 1, the edge computing system 200 of FIG. 2, an edge system configured host the edge manager 467, the controller 466, the container orchestrator 462 of FIG. 4, or the edge system 500 of FIG. 5 may implement the edge system 600.

The data pipeline 664 may include a series of components that are configured to pass a message from one component to the next such that it includes a chronologically ordered stream of messages. The data pipeline 664 may be configured to receive to input data 620, such as source data (e.g., from one of the data source(s) 120, 122 or 124 of FIG. 1 and/or the data source(s) 220 of FIG. 2) or data from another data pipeline.

The data pipeline 664 can be constructed using computing primitives and building blocks, such as VMs, containers, processes, or any combination thereof. In some examples, the stages of the data pipeline 664 may be described using a user interface or REST API, with data ingestion and movement handled by connector components built into the data pipeline 664. Thus, data may be passed between containers of a data pipeline using API calls. As depicted in FIG. 6, the data pipeline 664 may include a group of containers to form a pod that includes a connector 682, a first transformation runtime 683, a pipeline processor 684, a second transformation runtime 685, and a connector 686 each configured to perform various functions within the data pipeline 664 to consume, transform, and produce messages or data.

For example, the pipeline processor 684 may be configured to manage messaging between the connector 682, the first transformation runtime 683, the second transformation runtime 685, and the connector 686. In some examples, the connector 682, the first transformation runtime 683, the second transformation runtime 685, and the connector 686 may all provide acknowledge messages back to the pipeline processor 584 in response to receipt of messages. Thus, the pipeline processor 684 may act as a message broker within the data pipeline 564.

The connector 682 is configured to receive messages of a certain topic from a message system and to provide the received message to the pipeline processor 684. The connector 682 may include a data service connector configured to connect the data pipeline 664 to another data pipeline or a data source connector configured to connect the data pipeline 664 to an external data source. Thus, the message may include source data or data from another data pipeline.

The first transformation runtime 683 may receive messages from the pipeline processor 684 (e.g. provided by the connector 682 and/or the second transformation runtime 685) and is configured to transform the message data using a first runtime environment (e.g., Python, Java, etc.) to apply a respective function or algorithm to received source data to provide the transformed data. The first transformation runtime 683 is further configured to provide the transformed data in a message back to the pipeline processor 684. Similar to the first transformation runtime 683, the second transformation runtime 685 may be configured to receive messages from the pipeline processor 684 (e.g. provided by the connector 682 and/or the second transformation runtime 685) and is configured to transform the message data using a second runtime environment (e.g., Python, Java, etc.) to apply a respective function or algorithm to received source data to provide the transformed data. The second transformation runtime 685 is further configured to provide the transformed data in a message back to the pipeline processor 684. In some examples, the first transformation runtime 683 and the second transformation runtime 685 may be configured to apply common functions or algorithms in different runtime environments. In other examples, the first transformation runtime 683 and the second transformation runtime 685 may be configured to apply a different functions or algorithms in the different runtime environments. The functions or algorithms may include any type of function or algorithm, such as video processing, video encoding, image processing, event detection, alerting, any other function or algorithm, or any combination thereof. Each of the data pipelines may further include processor containers that are configured to manage messaging between connector and transformation containers). More or fewer than two transformation containers may be included in the data pipeline 664 without departing from the scope of the disclosure.

The connector 686 may include a data mover connector that is configured to receive messages from the pipeline processor 684 and is configured to publish the messages to a certain topic of a message system in order to provide data to external data pipelines. Thus, the topic to which the message is published by the connector 686 may be subscribed to by other data pipelines to further process the data and/or to provide the output data to a data plane.

Figure 7:
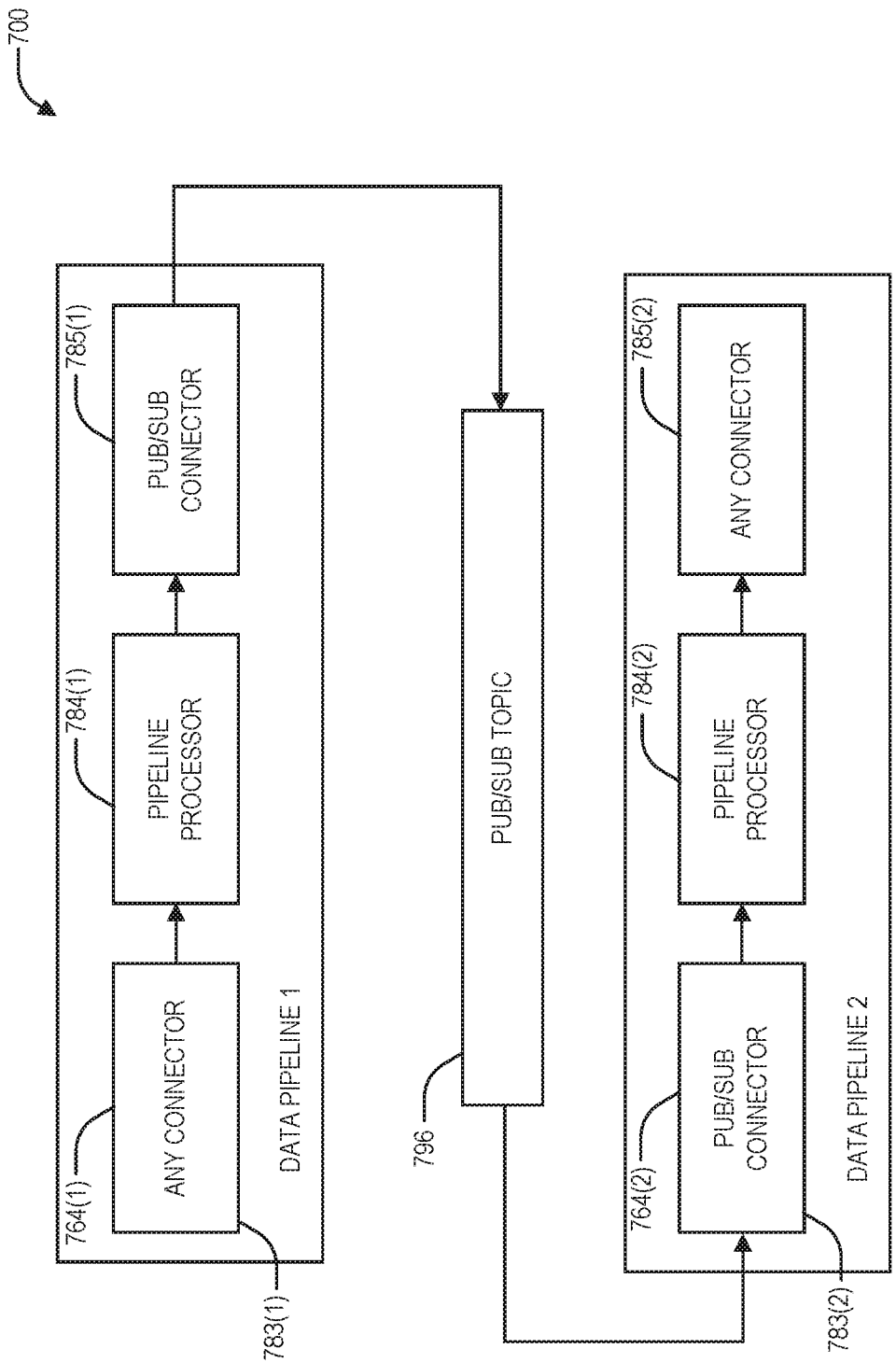
FIG. 7 is a block diagram illustrating multiple data pipelines of an edge system, in accordance with an embodiment of the present disclosure.

FIG. 7 is a block diagram illustrating multiple data pipelines 764(1)-(2) of an IoT system 700, in accordance with an embodiment of the present disclosure. Any of the edge cluster(s) 110, the edge device(s) 112, or the server/cluster 114 of FIG. 1, the edge computing system 200 of FIG. 2, an edge system configured host the edge manager 467, the controller 466, the container orchestrator 462 of FIG. 4, or the edge system 500 of FIG. 5, or the edge system 600 of FIG. 6 may implement the edge system 700.

The data pipelines 764(1)-(2) may be connected to one another via a pub/sub topic 796. The data pipeline 764(1) may be configured to receive to input data, such as source data (e.g., from one of the data source(s) 120, 122 or 124 of FIG. 1 and/or the data source(s) 220 of FIG. 2) or data from another data pipeline and to publish output data to the pub/sub topic 796. The data pipeline 764(1) may be configured to receive the data from the pub/sub topic 796 and to provide output data.

Within the data pipeline 764(1), the pipeline processor 784(1) may be configured to manage messaging between the connector 783(1) and the pub/sub connector 785(1). The connector 783(1) may include a data service connector configured to connect the data pipeline 764(1) to another data pipeline or a data source connector configured to connect the data pipeline 764(1) to an external data source. The pub/sub connector 785(1) may include a data mover connector configured to connect the data pipeline 764(1) to the data pipeline 764(2) via the pub/sub topic 796.

Within the data pipeline 764(2), the pipeline processor 784(2) may be configured to manage messaging between the pub/sub connector 783(2) and the connector 785(2). The pub/sub connector 783(2) may include a data service connector configured to connect the data pipeline 764(2) to the data pipeline 764(1) via the pub/sub topic 796. The connector 785(2) may include a data mover connector configured to connect the data pipeline 764(2) to another data pipeline or a configuration server connected to a data plane.

Figure 8:
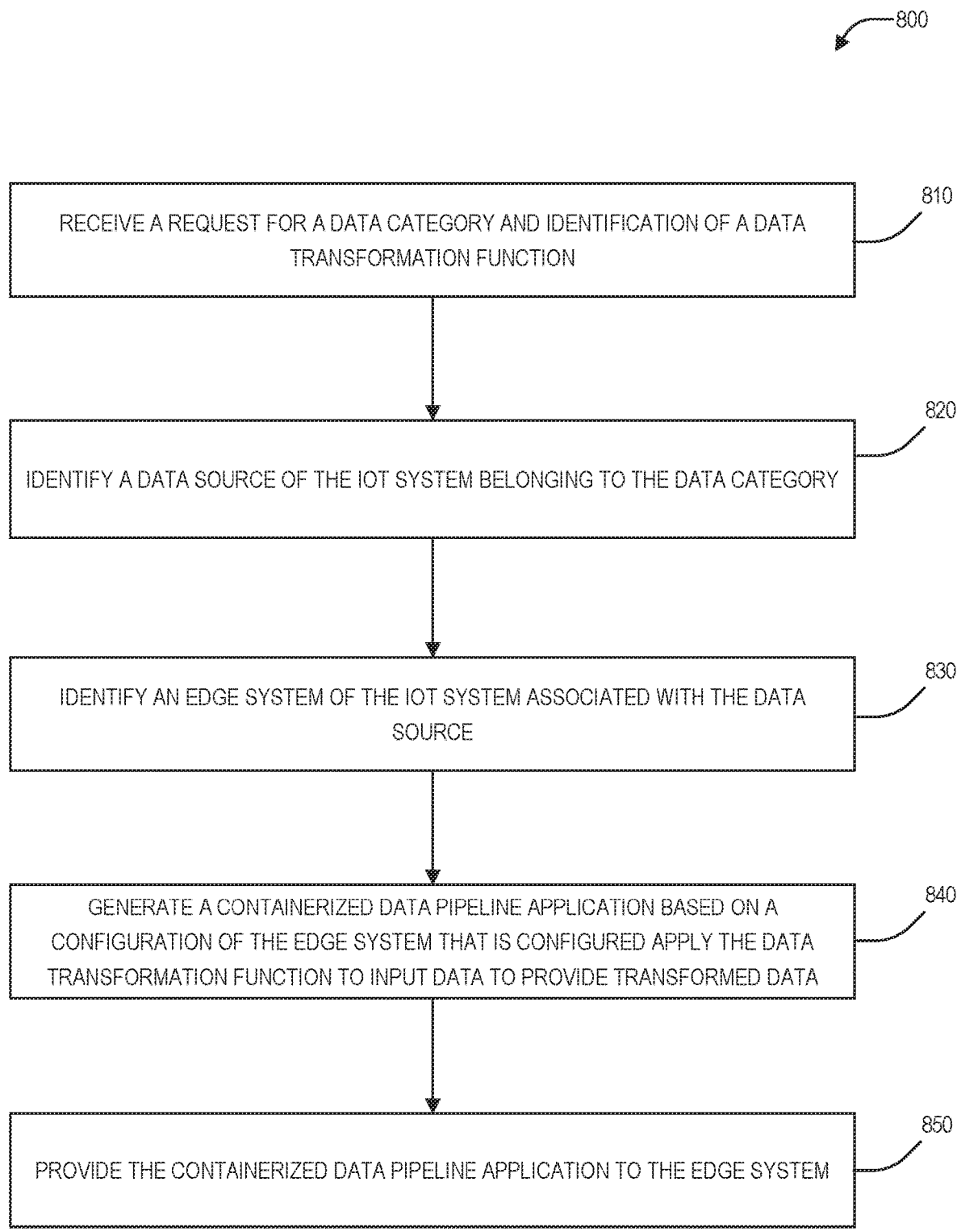
FIG. 8 is a flow diagram of a method to generate and deploy a containerized data pipeline application in an IoT system, in accordance with an embodiment of the present disclosure.

FIG. 8 is a flow diagram of a method 800 to generate and deploy a containerized data pipeline application in an IoT system, in accordance with an embodiment of the present disclosure. The method 800 may be performed by the centralized IoT manager 142 of FIG. 1 and/or any one or more (e.g., including in combination) of the centralized IoT manager instances 324(1)-(N) of FIG. 3. The containerized data pipeline application may include a data pipeline hosted on any of the edge stacks 111, 113, or 116 of FIG. 1, any of the data pipelines 264 of FIG. 2, the data pipeline 564 of FIG. 5, the data pipeline 664 of FIG. 6, the data pipelines 764(1)-(2) of FIG. 7, or any combination thereof.

The method 800 may include receiving a request for a data category and identification of a data transformation function, at 810. In some examples, the data category includes a type of data, a location of data, a source of data, or any combination thereof. The data transformation function may include any type of function or algorithm, such as video processing, video encoding, image processing, event detection, alerting, any other function or algorithm, or any combination thereof.

The method 800 may include identifying a data source of the IoT system belonging to the data category, at 820. The data source may include any of the data source(s) 120, 122, 124 of FIG. 1 and/or the data source(s) 220 of FIG. 2. The data source includes a camera, a temperature sensor, a microphone or transducer, a motion detector, another edge system of the IoT system, or any combination thereof.

The method 800 may include identifying an edge system of the IoT system associated with the data source, at 830. The edge system may include a cluster of computing devices (e.g., the edge cluster 110 of FIG. 1), a computing device (e.g., the edge device 112 of FIG. 1), a virtual machine (e.g., the edge VM 115 of FIG. 1), or any combination thereof. In some examples, the method 800 may further include determining a configuration of the edge system.

The method 800 may include generating a containerized data pipeline application based on a configuration of the edge system that is configured apply the data transformation function to source data from the data source to provide transformed data, at 840. The input data may include data from a data source (e.g., any of the data source(s) 120, 122, 124 of FIG. 1 and/or the data source(s) 220 of FIG. 2), data from another data pipeline or application (e.g., a data pipeline or application of any of the edge stacks 111, 113, or 116, any of the applications 263 or the data pipelines 264 of FIG. 2, the data pipeline 564 of FIG. 5, the data pipeline 664 of FIG. 6, any of the data pipelines 764(1)-(2) of FIG. 7, or any combination thereof, and/or the input data 620 of FIG. 6. In some examples, the method 800 may further include building a transformation container with the data transformation function configured to transform the source data from the data source to the transformed data. The containerized data pipeline application includes the transformation container. The transformation container may be adapted for a particular runtime environment (e.g., Python, Java, etc.). In some examples, the method 800 may further include building a second transformation container with the data transformation function configured to transform the source data from the data source to the transformed data for a second runtime environment that is different than a runtime environment that the transformation container is adapted for.

In some examples, the method 800 may further include building a subscriber container to configure to receive the source data from the data source and provide the source data to the transformation container. The containerized data pipeline application may include the subscriber container. In some examples, the method 800 may further include building a publisher container configured to provide the transformed data from the transformation container to an output of the data pipeline application. In some examples, the method 800 may further include building a processor container configured to manage messaging between components of the data pipeline application. That is, the processor container may be configured to manage messaging between the subscriber, transformation, and publisher containers.

The method 800 may include provide the containerized data pipeline application to the edge system, at 850. In some examples, the method 800 may further include generating a second containerized data pipeline application based on a configuration of a second identified edge system associated with a second data source belonging to the data category. The second containerized data pipeline application may be configured apply the data transformation function to second input data to provide second transformed data. In some examples, the configuration of the second edge system is different than the configuration of the edge system.

Figure 9:
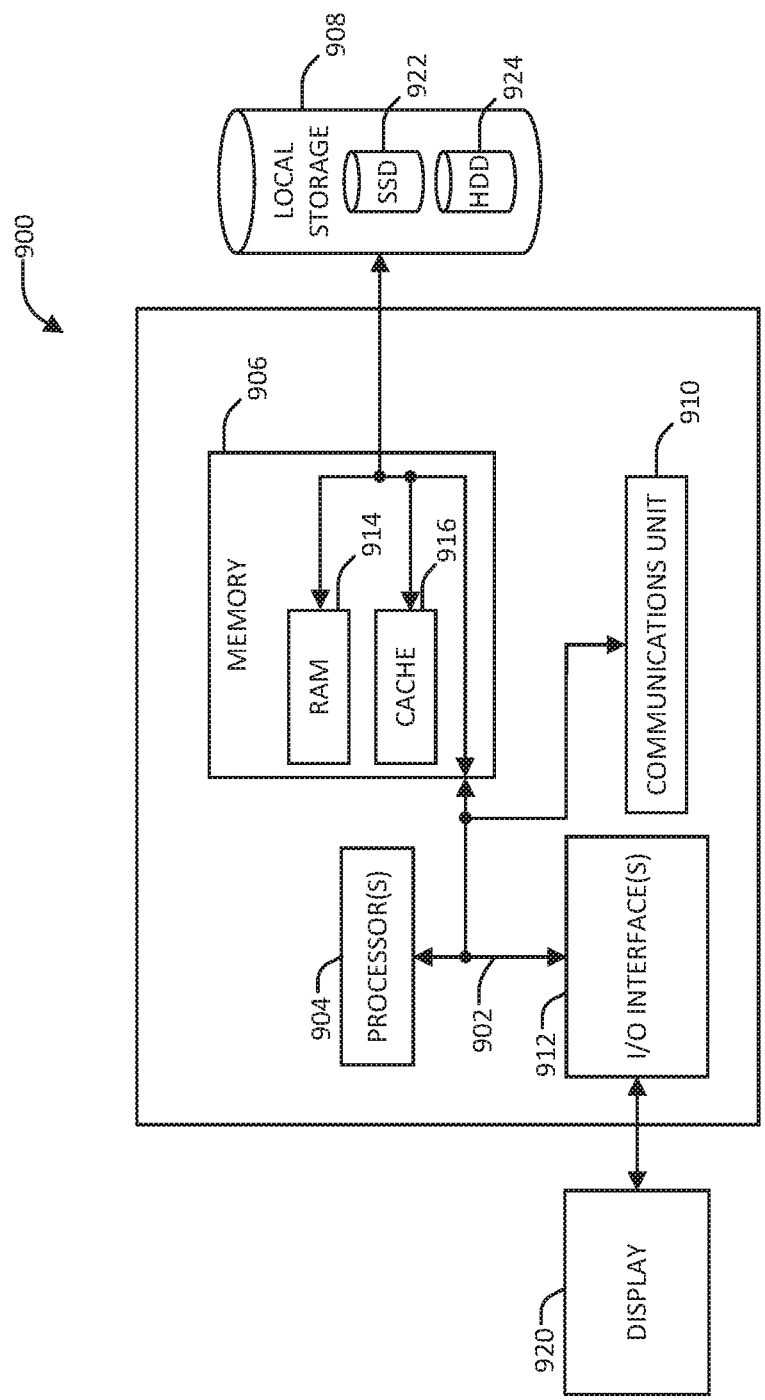
FIG. 9 is a block diagram of components of an edge system or computing in accordance with an embodiment of the present disclosure.

FIG. 9 depicts a block diagram of components of an edge system and/or a computing node (device) 900 in accordance with an embodiment of the present disclosure. It should be appreciated that FIG. 9 provides only an illustration of one implementation and does not imply any limitations with regard to the environments in which different embodiments may be implemented. Many modifications to the depicted environment may be made. The device 900 may implemented as any of an edge device or VM of the edge cluster(s) 110, the edge device(s) 112, the server/cluster 114, a computing node of the central IoT computing system 140, or a computing node of the data computing system 150 of FIG. 1, all or part of the edge computing system 200 of FIG. 2, any of the computing nodes 304(1)-(N) of FIG. 3, systems configured to host any of the centralized IoT manager 424, the edge manager 467, the controller 466, or the container orchestrator 462 of FIG. 4, the edge system 500 of FIG. 5, one or more edge systems configured to host the data pipeline 664 of the IoT system 600 of FIG. 6, one or more edge systems configured to host the data pipelines 764(1)-(2) of the IoT system 700 of FIG. 7, or any combination thereof. The device 900 may be configured to implement the method 800 of FIG. 8 to generate and distribute a containerized data pipeline application in an IoT system.

The device 900 includes a communications fabric 902, which provides communications between one or more processor(s) 904, memory 906, local storage 908, communications unit 910, I/O interface(s) 912. The communications fabric 902 can be implemented with any architecture designed for passing data and/or control information between processors (such as microprocessors, communications and network processors, etc.), system memory, peripheral devices, and any other hardware components within a system. For example, the communications fabric 902 can be implemented with one or more buses.

The memory 906 and the local storage 908 are computer-readable storage media. In this embodiment, the memory 906 includes random access memory RAM 914 and cache 916. In general, the memory 906 can include any suitable volatile or non-volatile computer-readable storage media. The local storage 908 may be implemented as described above with respect to local storage 306(1)-(N) and/or local storage network 370 of FIG. 3. In this embodiment, the local storage 908 includes an SSD 922 and an HDD 924, which may be implemented as described above with respect to any of SSD 340(1)-(N) and any of HDD 342(1)-(N), respectively.

Various computer instructions, programs, files, images, etc. may be stored in local storage 908 for execution by one or more of the respective processor(s) 904 via one or more memories of memory 906. In some examples, local storage 908 includes a magnetic HDD 924. Alternatively, or in addition to a magnetic hard disk drive, local storage 908 can include the SSD 922, a semiconductor storage device, a read-only memory (ROM), an erasable programmable read-only memory (EPROM), a flash memory, or any other computer-readable storage media that is capable of storing program instructions or digital information.

The media used by local storage 908 may also be removable. For example, a removable hard drive may be used for local storage 908. Other examples include optical and magnetic disks, thumb drives, and smart cards that are inserted into a drive for transfer onto another computer-readable storage medium that is also part of local storage 908.

Communications unit 910, in these examples, provides for communications with other data processing systems or devices. In these examples, communications unit 910 includes one or more network interface cards. Communications unit 910 may provide communications through the use of either or both physical and wireless communications links.

I/O interface(s) 912 allows for input and output of data with other devices that may be connected to device 900. For example, I/O interface(s) 912 may provide a connection to external device(s) 918 such as a keyboard, a keypad, a touch screen, and/or some other suitable input device. External device(s) 918 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 908 via I/O interface(s) 912. I/O interface(s) 912 also connect to a display 920.

Display 920 provides a mechanism to display data to a user and may be, for example, a computer monitor.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. At least one non-transitory computer-readable storage medium including instructions that, when executed by a centralized Internet of Things (IoT) manager of an IoT system, cause the centralized IoT manager to:
   receive a request to generate a containerized data pipeline application, wherein the request identifies a target category of data sources; and
   in response to the request:
      identify a data source of the IoT system belonging to the target category of data sources;
      identify an edge system of the IoT system connected to the data source;
      generate the containerized data pipeline application based on a hardware configuration of the edge system, wherein the containerized data pipeline application includes a transformation container configured to apply a data transformation function to input data to provide transformed data and a processor container configured to manage messaging between components of the containerized data pipeline application; and
      provide the containerized data pipeline application to the edge system.

2. The at least one computer-readable storage medium of claim 1, wherein the instructions further cause the centralized IoT manager to build, for inclusion in the containerized data pipeline application, a subscriber container to configured to receive the source data from the data source and provide the source data to the transformation container.

3. The at least one computer-readable storage medium of claim 1, wherein the instructions further cause the centralized IoT manager to build a publisher container configured to provide the transformed data from the transformation container to an output of the containerized data pipeline application.

4. The at least one computer-readable storage medium of claim 1, wherein the instructions further cause the centralized IoT manager to determine the hardware configuration of the edge system.

5. The at least one computer-readable storage medium of claim 1, wherein the instructions further cause the centralized service to determine a runtime configuration of the edge system.

6. The at least one computer-readable storage medium of claim 1, wherein the instructions further cause the centralized IoT manager to generate a second containerized data pipeline application based on a hardware configuration of a second identified edge system, wherein the second containerized data pipeline application is associated with a second data source belonging to the target category of data sources, wherein the second containerized data pipeline application is configured apply the data transformation function to second input data from the second data source to provide second transformed data.

7. The at least one computer-readable storage medium of claim 6, wherein the hardware configuration of the second identified edge system is different than the configuration of the edge system.

8. The at least one computer-readable storage medium of claim 1, wherein the edge system includes a cluster of computing devices, a computing device, a virtual machine, or any combination thereof.

9. The at least one computer-readable storage medium of claim 1, wherein the instructions further cause the centralized IoT manager to receive, with the request, a type of data, a location of data, a source of data, or any combination thereof as the target data category.

10. The at least one computer-readable storage medium of claim 1, wherein the instructions further cause the centralized IoT manager to identify a camera, a temperature sensor, a microphone or transducer, a motion detector, another edge system of the IoT system, or any combination thereof as the data source.

11. The at least one computer-readable storage medium of claim 1, wherein the data source comprises a camera, a temperature sensor, a microphone or transducer, a motion detector, or any combination thereof to provide the input data.

12. An edge system of an Internet of Things (IoT) system, comprising:
a memory configured to store instructions corresponding to a received data pipeline, and
a processor configured to execute the instructions, wherein, when executed, the instructions cause the processor to host:
the data pipeline generated in response to a request to generate a data pipeline that identified a target category of data sources and based on a hardware configuration of the processor and the memory; the data pipeline comprising:
a first connector container configured to receive input data from a connected data source of the target category of data sources and to provide a message having the input data;
a transformation container adapted for a first runtime environment and configured to receive the message having the input data and to apply a data transformation function to the input data to provide transformed data;
a second transformation container adapted for a second runtime environment that is different than the first runtime environment and configured to apply a second data transformation function to the input data; and
a second connector container configured to provide the transformed data in a message at an output of the data pipeline;
a pipeline processor configured to manage messaging between the first connector container, the transformation container, and the second connector container; and
a container orchestrator configured to deploy the data pipeline.

13. The edge system of claim 12, wherein the edge system is further configured to host a second data pipeline configured to apply a third data transformation function to the transformed data from the data pipeline to provide second transformed data.

14. The edge system of claim 12, wherein the first connector container includes a data source connector configured to receive data from a data source device of the IoT system.

15. The edge system of claim 12, wherein the first connector container includes a data service connector configured to receive data from another data pipeline of the IoT system.

16. The edge system of claim 12, wherein the data transformation function includes at least one of video processing, video encoding, image processing, event detection, alerting, any other function or algorithm, or any combination thereof.

17. An Internet of Things (IoT) system, comprising:
a data source belonging to a category of data sources and configured to provide input data;
an edge system connected to the data source to receive the input data and comprising a hardware configuration;
a centralized IoT manager configured to receive a request to generate a containerized data pipeline application, wherein the request identifies the category of data sources, in response to the request, the centralized IoT manager is further configured to:
identify the data source of the IoT system belonging to the category of data sources;
identify the edge system of the IoT system as being connected to the data source;
generate the containerized data pipeline application based on the hardware configuration of the edge system including a transformation container configured to apply a data transformation function to the input data from the data source to provide transformed data and a processor container configured to manage messaging between components of the containerized data pipeline application; and
provide the containerized data pipeline application to the edge system.

18. The IoT system of claim 17, wherein, further in response to the request, the centralized IoT manager is configured to generate a second containerized data pipeline application based on second hardware configuration of a second edge system that is different than the hardware configuration of the edge system for use in application of the data transformation function to input data to provide second transformed data.

19. The IoT system of claim 18, further comprising the second edge system comprising the second hardware configured and connected to a second data source belonging to the category of data sources.

20. The IoT system of claim 17, wherein the edge system includes a cluster of edge devices.

21. The IoT system of claim 17, wherein the edge system includes an edge device.

22. The IoT system of claim 17, wherein the centralized IoT manager is configured to receive, with the request, a type of data, a location of data, a source of data, or any combination thereof as the target data category.

* * * * *